US012079001B2

(12) United States Patent
Wu

(10) Patent No.: US 12,079,001 B2
(45) Date of Patent: **\*Sep. 3, 2024**

(54) METHOD, SYSTEM AND RELATED DEVICE OF IMPLEMENTING VEHICLE AUTOMATICALLY WEIGHING

(71) Applicant: Beijing Tusen Zhitu Technology Co., Ltd., Beijing (CN)

(72) Inventor: Nan Wu, Beijing (CN)

(73) Assignee: Beijing Tusen Zhitu Technology Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/316,155

(22) Filed: May 11, 2023

(65) Prior Publication Data

US 2023/0280755 A1    Sep. 7, 2023

Related U.S. Application Data

(60) Continuation of application No. 17/340,743, filed on Jun. 7, 2021, now Pat. No. 11,650,594, which is a
(Continued)

(30) Foreign Application Priority Data

Jul. 21, 2017    (CN) .......................... 201710600461.6

(51) Int. Cl.
*G05D 1/00*      (2006.01)
*B60W 50/00*     (2006.01)
(Continued)

(52) U.S. Cl.
CPC ........... *G05D 1/0225* (2013.01); *B60W 50/00* (2013.01); *G01G 19/021* (2013.01);
(Continued)

(58) Field of Classification Search
CPC ............... G05D 1/0225; G05D 1/0088; G05D 2201/0213; B60W 50/00; G07B 15/06;
(Continued)

(56) References Cited

U.S. PATENT DOCUMENTS 4,192,394 A  *  3/1980  Simpson ................ G01G 19/02
                                                  340/933
5,880,409 A  *  3/1999  Hartman ................ G01G 19/12
                                                  177/137
(Continued)

FOREIGN PATENT DOCUMENTS

CN       101670830 A       3/2010
CN       205091571 U       3/2016
(Continued)

OTHER PUBLICATIONS

Ahn, Kyoungho et al., "The Effects of Route Choice Decisions on Vehicle Energy Consumption and Emissions", Virginia Tech Transportation Institute, Blacksburg, VA 24061, date unknown, pp. 1-34.
(Continued)

*Primary Examiner* — Muhammad Shafi
(74) *Attorney, Agent, or Firm* — Perkins Coie LLP

(57) ABSTRACT

The application discloses a method, system and related device of implementing vehicle automatically weighing, so as to achieve the automatically weighing of the unmanned vehicle. The method includes: controlling, by a vehicle controller, a vehicle to drive automatically and stop at a weighing position; weighing, by a weighbridge sensor, the vehicle when sensing the vehicle stopping at the weighing position, and sending weighing end information to the vehicle controller; and controlling, by the vehicle controller, the vehicle to start and leave the weighing position when receiving the weighing end information.

20 Claims, 8 Drawing Sheets

Related U.S. Application Data division of application No. 16/035,663, filed on Jul. 15, 2018, now Pat. No. 11,029,696.

(51) Int. Cl.
   *G01G 19/02* (2006.01)
   *G07B 15/06* (2011.01)
   *G07C 5/00* (2006.01)

(52) U.S. Cl.
   CPC ............ *G05D 1/0088* (2013.01); *G07B 15/06* (2013.01); *G07C 5/008* (2013.01); *G07B 15/063* (2013.01)

(58) Field of Classification Search
   CPC .... G07B 15/063; G01G 19/021; G01G 19/02; G07C 5/008
   USPC .......................................................... 701/23
   See application file for complete search history.

(56) References Cited

U.S. PATENT DOCUMENTS

| | | | |
|---|---|---|---|
| 6,037,550 | A * | 3/2000 | Bradley ................. G01G 19/12 177/136 |
| 6,777,904 | B1 | 8/2004 | Degner |
| 7,103,460 | B1 | 9/2006 | Breed |
| 7,783,403 | B2 | 8/2010 | Breed |
| 8,412,449 | B2 | 4/2013 | Trepagnier |
| 8,788,134 | B1 | 7/2014 | Litkouhi |
| 8,965,621 | B1 | 2/2015 | Urmson |
| 9,002,632 | B1 | 4/2015 | Emigh |
| 9,111,444 | B2 | 8/2015 | Kaganovich |
| 9,134,402 | B2 | 9/2015 | Sebastian |
| 9,248,835 | B2 | 2/2016 | Tanzmeister |
| 9,315,192 | B1 | 4/2016 | Zhu |
| 9,317,033 | B2 | 4/2016 | Ibanez-guzman |
| 9,342,074 | B2 | 5/2016 | Dolgov |
| 9,399,397 | B2 | 7/2016 | Mizutani |
| 9,438,878 | B2 | 9/2016 | Niebla |
| 9,476,970 | B1 | 10/2016 | Fairfield |
| 9,535,423 | B1 | 1/2017 | Debreczeni |
| 9,568,915 | B1 | 2/2017 | Berntorp |
| 9,587,952 | B1 | 3/2017 | Slusar |
| 9,720,418 | B2 | 8/2017 | Stenneth |
| 9,723,097 | B2 | 8/2017 | Harris |
| 9,723,099 | B2 | 8/2017 | Chen |
| 9,738,280 | B2 | 8/2017 | Rayes |
| 9,746,550 | B2 | 8/2017 | Nath |
| 10,504,094 | B1 * | 12/2019 | Gaudin .............. G06Q 20/3278 |
| 2008/0249667 | A1 | 10/2008 | Horvits |
| 2009/0040054 | A1 | 2/2009 | Wang |
| 2010/0049397 | A1 | 2/2010 | Lin |
| 2016/0196538 | A1 * | 7/2016 | Mori .................. G06Q 20/3276 705/16 |
| 2016/0321381 | A1 | 11/2016 | English |
| 2016/0375907 | A1 | 12/2016 | Erban |
| 2017/0169369 | A1 * | 6/2017 | Garnavi ................. G06V 20/54 |

FOREIGN PATENT DOCUMENTS

| | | |
|---|---|---|
| CN | 106296843 A | 1/2017 |
| CN | 106530427 A | 3/2017 |
| CN | 106887051 A | 6/2017 |

OTHER PUBLICATIONS

Athanasiadis, Thanos et al., "Semantic Image Segmentation and Object Labeling", IEEE Transactions on Circuits and Systems for Video Technology, vol. 17, No. 3, Mar. 2007, pp. 1-15.

Barth. Matthew et al., "Recent Validation Efforts for a Comprehensive Modal Emissions Model", Transportation Research Record 1750, Paper No. 01-0326, College of Engineering, Center for Environmental Research and Technology, University of California, Riverside, CA 92521, date Unknown, pp. 1-11.

Chinese Application No. 201710600461.6, First Office Action Mailed Jun. 26, 2018, pp. 1-15.

Chinese Application No. 201710600461.6, First Search Report mailed Jun. 15, 2018, pp. 1-2.

Chinese Application No. 201710600461.6, Second Office Action Mailed Sep. 18, 2018, pp. 1-16.

Cordts, Marius et al., "The Cityscapes Dataset for Semantic Urban Scene Understanding", Proceedings of the IEEE Computer Society Conference on Computer Vision and Pattern Recognition (CVPR), Las Vegas, Nevada, 2016, pp. 1-11.

Dai, Jifeng et al., (Microsoft Research), "Instance-aware Semantic Segmentation via Multi-task Network Cascades", CVPR 2016, pp. 1-10.

Guarneri, Paolo, et al., "A Neural-Network-Based Model for the Dynamic Simulation of the Tire/ Suspension System While Traversing Road Irregularities, " in IEEE Transactions on Neural Networks, vol. 19, No. 9, op. 1549-1563, Sep. 2008, pp. 1-15.

Huval, Brody, et al., "An Empirical Evaluation of Deep Learning on Highway Driving", arXiv:1504.01716v3 [cs.RO] Apr. 17, 2015, pp. 1-7.

Jain, Suyong Dutt, Grauman, Kristen, "Active Image Segmentation Propagation", In Proceedings of the IEEE Conference on Computer Vision and Pattern Recognition (CVPR), Las Vegas, Jun. 2016, pp. 1-10.

Kendall, Alex et al., "What Uncertainties Do We Need in Bayesian Deep Learning for Computer Vision", rXiv:1703.04977v1 (cs.CV) Mar. 15, 2017, pp. 1-11.

Li, Tian "Proposal Free Instance Segmentation Based on Instance-aware Metric", Department of Computer Science, Cranberry-Lemon University, Pittsburgh, PA., date unknown, pp. 1-2.

MacAodha, Oisin, et al., "Hierarchical Subquery Evaluation for Active Learning on a Graph", In Proceedings of the IEEE Conference on Computer Vision and Pattern Recognition (CVPR), 2014, pp. 1-8.

Norouzi, Mohammad et al., "Hamming Distance Metric Learning", Departments of Computer Science and Statistics, University of Toronto, date unknown, pp. 1-9.

Paszke, Adam, et al., Enet: A deep neural network Architecture for real-time semantic segmentation. CoRR, abs/1606.02147, 2016, pp. 1-10.

Ramos, Sebastian, et al., "Detecting Unexpected Obstacles or Self-Driving Cars: Fusing Deep Learning and Geometric Modeling", arXiv: 1612.06573v1 [cs.CV] Dec. 20, 2016, pp. 1-8.

Richter, Stephan R., et al., "Playing for Data: Ground Truth from Computer Games", Intel Labs, European Conference on Computer Vision (ECCV), Amsterdam, the Netherlands, 2016, pp. 1-16.

Schroff, Florian, et al., (Google), "FaceNet: A Unified Embedding for Face Recognition and Clustering", CVPR 2015, pp. 1-10.

Somani, Adhiraj et al., "DESPOT: Online POMDP Planning with Regularization", Department of Computer Science, National University of Singapore, date unknown, pp. 1-9.

Spinello, et al., "Multiclass Multimodal Detection and Tracking n Urban Environments", Sage Journals, vol. 29 issue: 12, pp. 1498-1515 Miele first published online: Oct. 7, 2010; Issue published: Oct. 1, 2010, pp. 1-18.

Wei, Junqing et al., "A Prediction- and Cost Function-Based Algorithm for Robust Autonomous Freeway Driving", 2010 IEEE Intelligent Vehicles Symposium, University of California, San Diego, CA, USA, Jun. 21-24, 2010, pp. 1-6.

Welinder, Peter et al., "The Multidimensional Wisdom of Crowds"; http:1/ www.vision.caltech.edu/visipedia/papers/WelinderEtalNIPS10. pdf, 2010, pp. 1-9.

Yang, Chenguang et al., "Neural Network-Based Motion Control of an Underactuated Wheeled Inverted Pendulum Model," in IEEE Transactions on Neural Networks and Learning Systems, vol. 25, No. 11, pp. 2004-2016, Nov. 2014, pp. 1-13.

Yu, Kai, et al., "Large-scale Distributed Video Parsing and t::valuation Platform", Center for Research on Intelligent Perception and

(56) References Cited

OTHER PUBLICATIONS

Computing, Institute of automation, Chinese Academy of Sciences, China, arXiv:1611.09580v1 [cs.CV] Nov. 29, 2016, pp. 1-7.

* cited by examiner

METHOD, SYSTEM AND RELATED DEVICE OF IMPLEMENTING VEHICLE AUTOMATICALLY WEIGHING

CROSS-REFERENCES TO RELATED APPLICATIONS

This application is a continuation of U.S. patent application Ser. No. 17/340,743, filed on Jun. 7, 2021, granted on May 16, 2023, which is divisional of U.S. patent application Ser. No. 16/035,663, filed on Jul. 15, 2018, which in turn claims the priority from Chinese Patent Application No. 201710600461.6, filed on Jul. 21, 2017. The aforementioned disclosures are hereby incorporated by reference in their entireties.

BACKGROUND

The application relates to the autonomous driving field, and particularly to a method of implementing vehicle automatically weighing, a system of implementing vehicle automatically weighing, a vehicle controller, a weighbridge sensor and a payment terminal.

With the development of the autonomous driving technology, the autonomous vehicles will be more and more popular. Thus, for the autonomous vehicles, how to implement the automatically weighing at the weighing position becomes an urgent problem to be solved by those skilled in the art. At present, there is no related disclosed technology of implementing the automatically weighing of autonomous vehicles.

SUMMARY

The application provides a method of implementing vehicle automatically weighing, a vehicle controller, a weighbridge sensor and a payment terminal.

An embodiment of the application provides a method of implementing vehicle automatically weighing, which includes:
  controlling, by a vehicle controller, a vehicle to drive automatically and stop at a weighing position;
  weighing, by a weighbridge sensor, the vehicle when sensing the vehicle stopping at the weighing position, and sending weighing end information to the vehicle controller; and
  controlling, by the vehicle controller, the vehicle to start and leave the weighing position when receiving the weighing end information.

An embodiment of the application further provides a vehicle controller, which includes:
  a communication unit configured to receive and send information; and
  a control unit configured to control a vehicle to drive automatically and stop at a weighing position; and control the vehicle to start and leave the weighing position when receiving weighing end information.

An embodiment of the application provides a weighbridge sensor, which includes:
  a communication unit configured to receive and send information; and
  a weighing control unit comprising a processor and at least one memory, wherein the at least one memory stores at least one machine executable instruction, and the processor executes the at least one machine executable instruction to weigh a vehicle when sensing the vehicle stopping at a weighing position, and send, through the communication unit, weighing end information to a vehicle controller of the vehicle.

An embodiment of the application provides a payment terminal, which includes:
  a communication unit configured to receive and send information;
  a storage unit configured to store a weighing result and driving mileage corresponding to vehicle identification information; and
  a payment control unit comprising a processor and at least one memory, wherein the at least one memory stores at least one machine executable instruction, and the processor executes the at least one machine executable instruction to obtain the vehicle identification information of a vehicle stopping at a weighing position and obtain the weighing result and the driving mileage corresponding to the vehicle identification information from the storage unit; calculate payment amount according to the obtained weighing result and driving mileage; and send, through the communication unit, leaving indication information to a vehicle controller after determining that the vehicle controller pays the payment amount.

An embodiment of the application further provides a system of implementing vehicle automatically weighing, which includes a vehicle controller and a weighbridge sensor, wherein:
  the vehicle controller is configured to control a vehicle to drive automatically and stop at a weighing position, and control the vehicle to start and leave the weighing position when receiving weighing end information sent by the weighbridge sensor; and
  the weighbridge sensor is configured to weigh the vehicle when sensing the vehicle stopping at the weighing position, and send the weighing end information to the vehicle controller.

BRIEF DESCRIPTION OF THE DRAWINGS

The accompanying drawings are used to provide the further understanding of the application and constitute a part of the specification, and serve to explain the application together with the embodiments of the application but not limit the application.

DETAILED DESCRIPTION

In order to make those skilled in the art better understand the technical solution in the application, the technical solution in the embodiments of the application will be described clearly and completely below in combination with the accompanying drawings in the embodiments of the application. Obviously the described embodiments are just a part of the embodiments of the application but not all the embodiments. Based upon the embodiments of the application, all of other embodiments obtained by those ordinary skilled in the art without creative work should pertain to the protection scope of the application.

In the method and system of implementing the vehicle automatically weighing provided by the embodiments of the application, a weighbridge sensor is set at each weighing position, and the vehicle controller controls the vehicle to drive automatically and stop at the weighing position, and then interacts with the weighbridge sensor at the weighing position to accomplish the automatically weighing without manual intervention, thereby implementing the function of the automatically weighing of the autonomous vehicle.

In an embodiment of the application, the vehicle controller of the vehicle can be a DSP (Digital Signal Processor), FPGA (Field-Programmable Gate Array) controller, industrial computer, trip computer, ECU (Electronic Control Unit), or VCU (Vehicle Control Unit) or the like, which is not limited strictly by the present application.

First Embodiment

Figure 1:
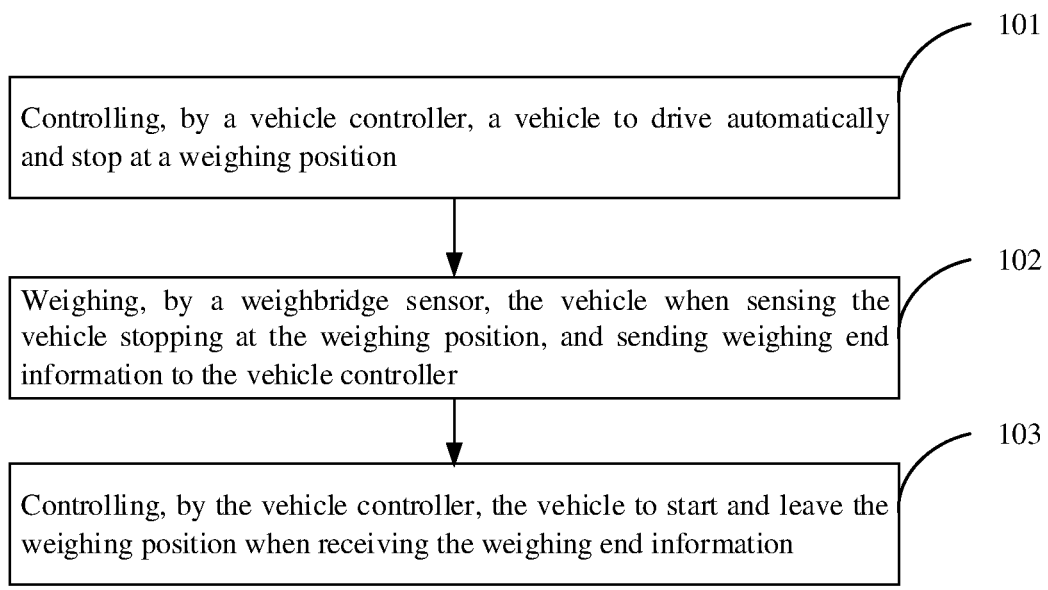
FIG. 1 is the first one of flow charts of a method of implementing vehicle automatically weighing in an embodiment of the application.

Referring to FIG. 1 which is a flow chart of a method of implementing vehicle automatically weighing in an embodiment of the application, the method includes:

Step 101: controlling, by a vehicle controller, a vehicle to drive automatically and stop at a weighing position.

Step 102: weighing, by a weighbridge sensor, the vehicle when sensing the vehicle stopping at the weighing position, and sending weighing end information to the vehicle controller.

Step 103: controlling, by the vehicle controller, the vehicle to start and leave the weighing position when receiving the weighing end information.

Figure 2:
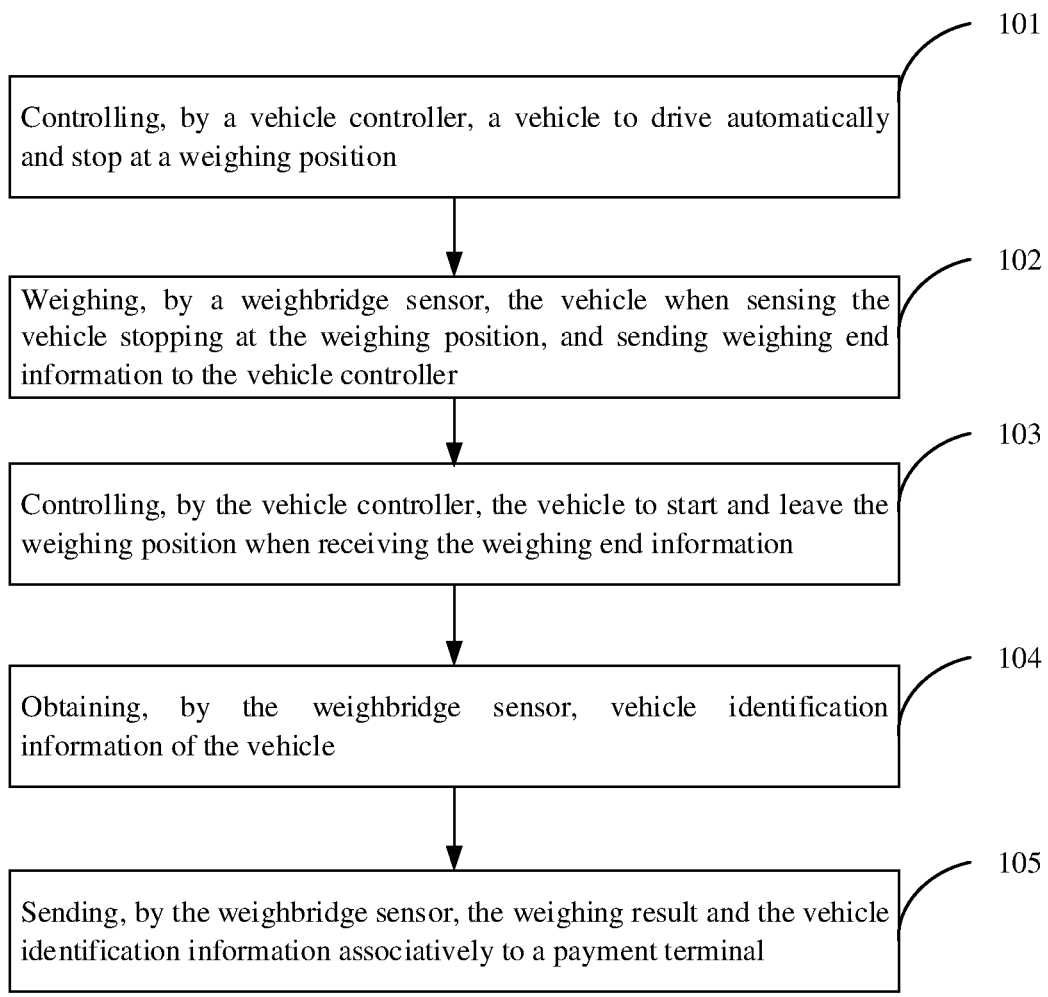
FIG. 2 is the second one of flow charts of a method of implementing vehicle automatically weighing in an embodiment of the application.

Preferably, in some application scenarioes such as expressways, warehouses, highway ports, sea-front ports or the like, the fee paid by the vehicle is related to the load of the vehicle, and a payment position may often be set around the weighing position. Thus based on these application scenarioes, the above-mentioned method flow of the application as shown in FIG. 1 can further includes the following steps 104 and 105, wherein the steps 104 and 105 can be set after the step 102, or can be set after the step 103, which is not limited strictly by the present application. As shown in FIG. 2, after the step 103 as shown in FIG. 1, the method further includes steps 104 to 105, wherein:

Step 104: obtaining, by the weighbridge sensor, vehicle identification information of the vehicle.

Step 105: sending, by the weighbridge sensor, the weighing result and the vehicle identification information associatively to a payment terminal.

Preferably, in an embodiment of the application, the step 104 can be implemented specifically by but not limited to any of the following modes (modes A1 to A2):

Mode A1: the weighbridge sensor identifies the vehicle identification information of the vehicle.

Mode A2: the weighbridge sensor receives the vehicle identification information from the vehicle controller. That is, in the mode A2, when controlling the vehicle to stop at the weighing position, the vehicle controller sends actively the vehicle identification information to the weighbridge sensor corresponding to the weighing position.

The vehicle controller can communicate with the weighbridge sensor via a base station, bluetooth, WIFI or the like, which is not limited strictly by the present application.

The mode A1 can be implemented by but not limited to the following mode A11 or A12:

Mode A11: the weighbridge sensor controls a sensor to take an image of the vehicle, and performs image identification processing on the image to obtain the vehicle identification information of the vehicle.

The sensor can be a video camera which can be mounted nearly to the weighing position with the lens faces directly to the weighing position, e.g., mounted on a fixture near the weighing position. The angle of the lens of the video camera can be adjusted automatically.

According to the image posted back from the camera, the weighbridge sensor can perform the image processing on this image. When the vehicle identification information is identified from the image, the vehicle identification information is to be verified; when the vehicle identification information is not identified from the image, the shooting angle of the camera is adjusted automatically, and the above actions are repeated until the vehicle identification information is identified.

The weighbridge sensor identifies the vehicle identification information from the image, which can be achieved by the following way: the weighbridge sensor extracts features from the image, compares the extracted features with the features corresponding to the preset vehicle identification information, and determines the vehicle identification information according to the features compared successfully. In an embodiment of the application, the above vehicle identification information is the information associated only with the vehicle, for example, can be the license plate number. When the vehicle identification information is the license plate number, the features corresponding to the vehicle identification information include size, shape (rectangular frame), color (blue or black), text features (length of the text string in the rectangular frame) and the like.

Mode A12: the weighbridge sensor controls the sensor to scan a two-dimensional code or bar code on the vehicle, to obtain the vehicle identification information of the vehicle.

In an embodiment of the application, the two-dimensional code or bar code containing the vehicle identification information can be pasted or printed in advance on a particular position of the vehicle, such as the front windshield, the left side panel of the vehicle or the vehicle undercarriage.

The weighbridge sensor adjusts the shooting angle of the camera until the two-dimensional code or bar code is scanned successfully.

Figure 3:
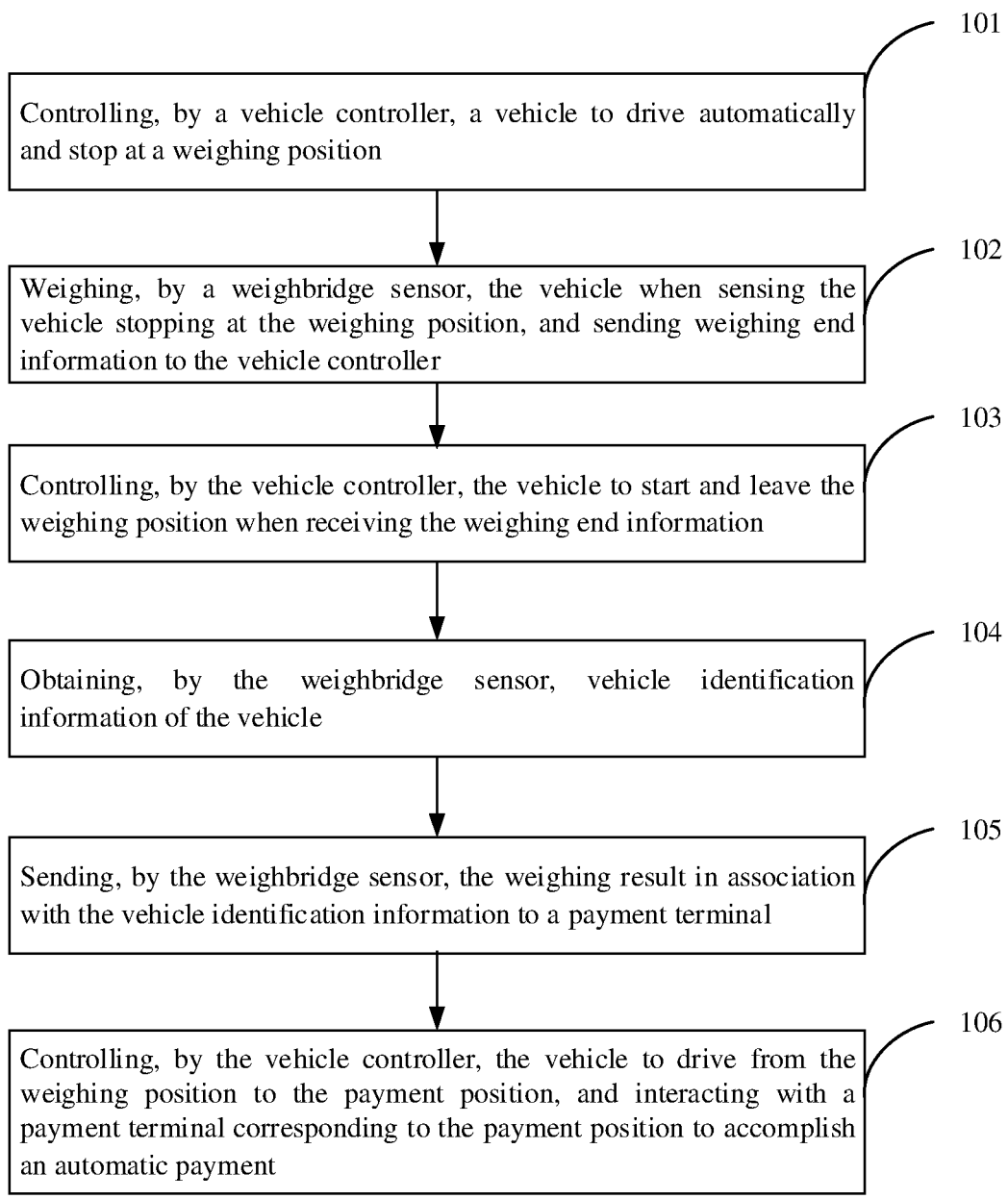
FIG. 3 is the third one of flow charts of a method of implementing vehicle automatically weighing in an embodiment of the application.

Preferably, the method flow as shown in FIG. 2 can further includes step 106, as shown in FIG. 3:

Step 106: controlling, by the vehicle controller, the vehicle to drive from the weighing position to the payment position, and interacting with the payment terminal corresponding to the payment position to accomplish an automatic payment.

Figure 4:
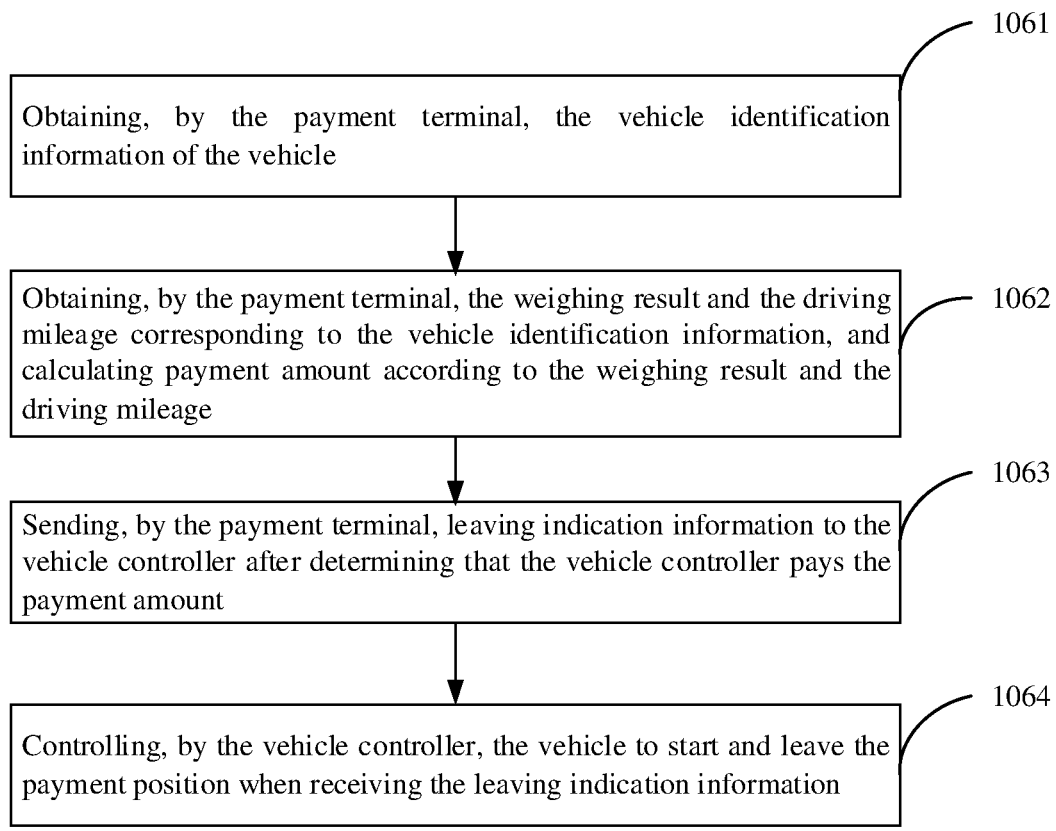
FIG. 4 is the first one of flow charts of the vehicle controller interacting with the payment terminal to accomplish the automatic payment in an embodiment of the application.

Preferably, in the above step 106, the vehicle controller interacts with the payment terminal at the payment position to accomplish the automatic payment, of which the specific implementation can refer to the flow chart as shown in FIG. 4:

Step 1061: obtaining, by the payment terminal, the vehicle identification information of the vehicle.

Step 1062: obtaining, by the payment terminal, the weighing result and the driving mileage corresponding to the vehicle identification information, and calculating payment amount according to the weighing result and the driving mileage.

In embodiments of the application, the payment terminal calculates the payment amount according to the weighing result and the driving mileage, which can be achieved by the following way: the payment terminal prestores the roadway charging standard, in which the fees to be paid by the vehicles of different types and different weights when driving 1 kilometer on various roadways are recorded; the payment terminal calculates the fee required to be paid per kilometer by the vehicle according to the obtained weighing result, the vehicle type and the driven roadway, and then calculates the product of the fee paid for per kilometer and the driving mileage (in kilometers) to obtain the payment amount required to be paid by the vehicle.

For example, the charging standards corresponding to the truck of more than 15 tones on different expressways are as follows:

1) 2 Yuan/kilometre on the G1 Beijing-Haerbin expressway, G6 Beijing-Tibet expressway, G7 Beijing-Xinjiang expressway, G45 Daqing-Guangzhou expressway, G4501 sixth ring road, G102 Tongzhou-Yanjiao expressway, G106 Beijing-Guangzhou line, S15 Beijing-Tianjin expressway, S36 airport northern line, S46 Beijing-Pinggu expressway.
2) 0.81 Yuan/kilometre on the G2 Beijing-Shanghai expressway.
3) 2.5 Yuan/kilometre on the G4 Beijing-Hong Kong-Macao expressway.
4) 2 Yuan/kilometre on the G103 Beijing Tanggu line, S12 airport expressway.

Step 1063: sending, by the payment terminal, leaving indication information to the vehicle controller after determining that the vehicle controller pays the payment amount.

Step 1064: controlling, by the vehicle controller, the vehicle to start and leave the payment position when receiving the leaving indication information.

In an embodiment of the application, in the step 1061, the payment terminal obtains the vehicle identification information of the vehicle, which can be achieved by but not limited to any of the following modes (modes B1 and B2):

Mode B1: the payment terminal identifies the vehicle identification information of the vehicle.

Mode B2: the payment terminal receives the vehicle identification information of the vehicle from the vehicle controller.

The vehicle controller can communicate with the payment terminal via a base station, bluetooth, WIFI or the like, which is not limited strictly by the present application.

The mode B1 can be achieved by but not limited to the following mode B11 or B12:

Mode B11: the payment terminal controls a sensor to take an image of the vehicle, and performs image identification processing on the image to obtain the vehicle identification information of the vehicle.

The sensor can be a video camera which can be mounted nearly to the payment position, where the lens faces directly to the payment position, e.g., mounted on a fixture near the payment position. The angle of the lens of the video camera can be adjusted automatically.

According to the image posted back from the camera, the payment terminal can perform the image processing on this image. When the vehicle identification information is identified from the image, the vehicle identification information is to be verified; if the vehicle identification information is not identified from the image, the shooting angle of the camera is adjusted automatically and the above actions are repeated until the vehicle identification information is identified.

The payment terminal identifies the vehicle identification information from the image, which can be achieved by the following way: the payment terminal extracts features from the image, compares the extracted features with the features corresponding to the preset vehicle identification information, and determines the vehicle identification information according to the features compared successfully. In an embodiment of the application, the above vehicle identification information is the information associated only with the vehicle, for example, can be the license plate number. When the vehicle identification information is the license plate number, the features corresponding to the vehicle identification information include size, shape (rectangular frame), color (blue or black), text features (length of the text string in the rectangular frame) and the like.

Mode B12: the payment terminal controls the sensor to scan a two-dimensional code or bar code on the vehicle, to obtain the vehicle identification information of the vehicle.

In an embodiment of the application, the two-dimensional code or bar code containing the vehicle identification information can be pasted or printed in advance on a particular position of the vehicle, such as the front windshield, the left side panel of the vehicle. The payment terminal adjusts the shooting angle of the camera until the two-dimensional code or bar code is scanned successfully.

Figure 5:
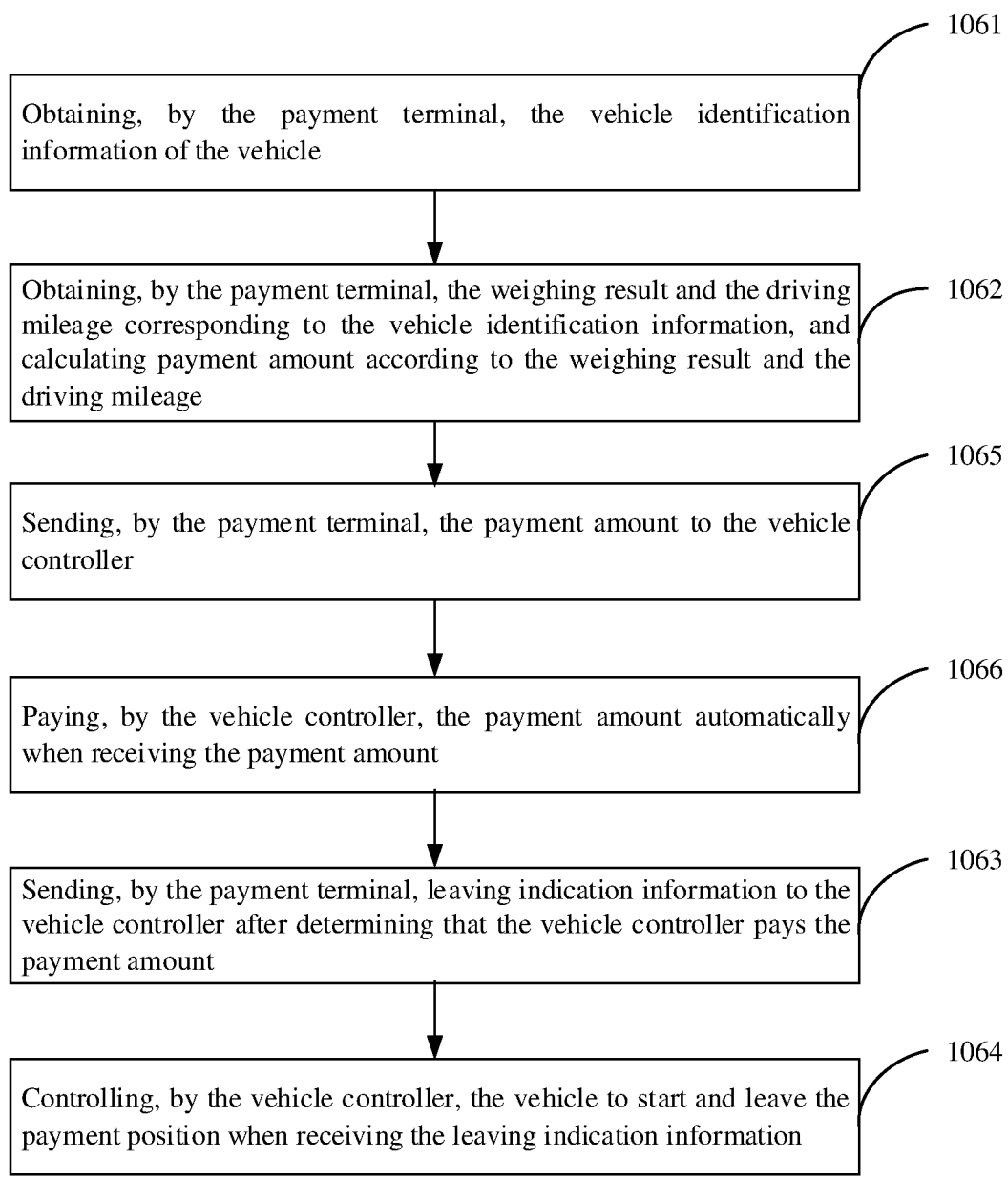
FIG. 5 is the second one of flow charts of the vehicle controller interacting with the payment terminal to accomplish the automatic payment in an embodiment of the application.

In an example, the payment terminal sends the calculated payment amount to the vehicle controller, and the vehicle controller pays the corresponding payment amount actively. In this example, the flow as shown in FIG. 4 further includes the following steps 1065 and 1066, as shown in FIG. 5:

Step 1065: sending, by the payment terminal, the payment amount to the vehicle controller;

Step 1066: paying, by the vehicle controller, the payment amount automatically when receiving the payment amount.

In the step 1063, the payment terminal determines that the vehicle controller pays the payment amount, which includes: the payment terminal determines that the vehicle controller pays the payment amount when collecting the payment amount paid by the vehicle controller successfully.

The above step 1066 can be implemented by but not limited to any of the following modes (modes C1 to C2):

Mode C1: the vehicle controller invokes a third-party payment software to pay the payment amount.

Mode C2: the vehicle controller controls an on-board camera to scan a two-dimensional code corresponding to the payment terminal, and invokes a third-party payment software to pay the payment amount.

In the mode C2, the two-dimensional code corresponding to the payment terminal is arranged at a position around the payment terminal.

In another example, the payment terminal in the embodiments of the application directly records the payment amount in the bill of the payer in way of keeping accounts when calculating the payment amount, the payment terminal sends the bill to the payer periodically (e.g., every month, every quarter, every half year or every year), and the payer pays the corresponding fees, where the payer can be the driver of the vehicle, the transport company to which the vehicle belongs, or the like.

In yet another example, the payment terminal can also prestore the association relationship of the vehicle identification information and the account of Electronic Toll Collection (ETC) system of each vehicle, and when a vehicle passes through the payment terminal, the payment terminal deducts the current payment amount from the account of ETC system corresponding to the vehicle identification information of this vehicle.

Figure 6:
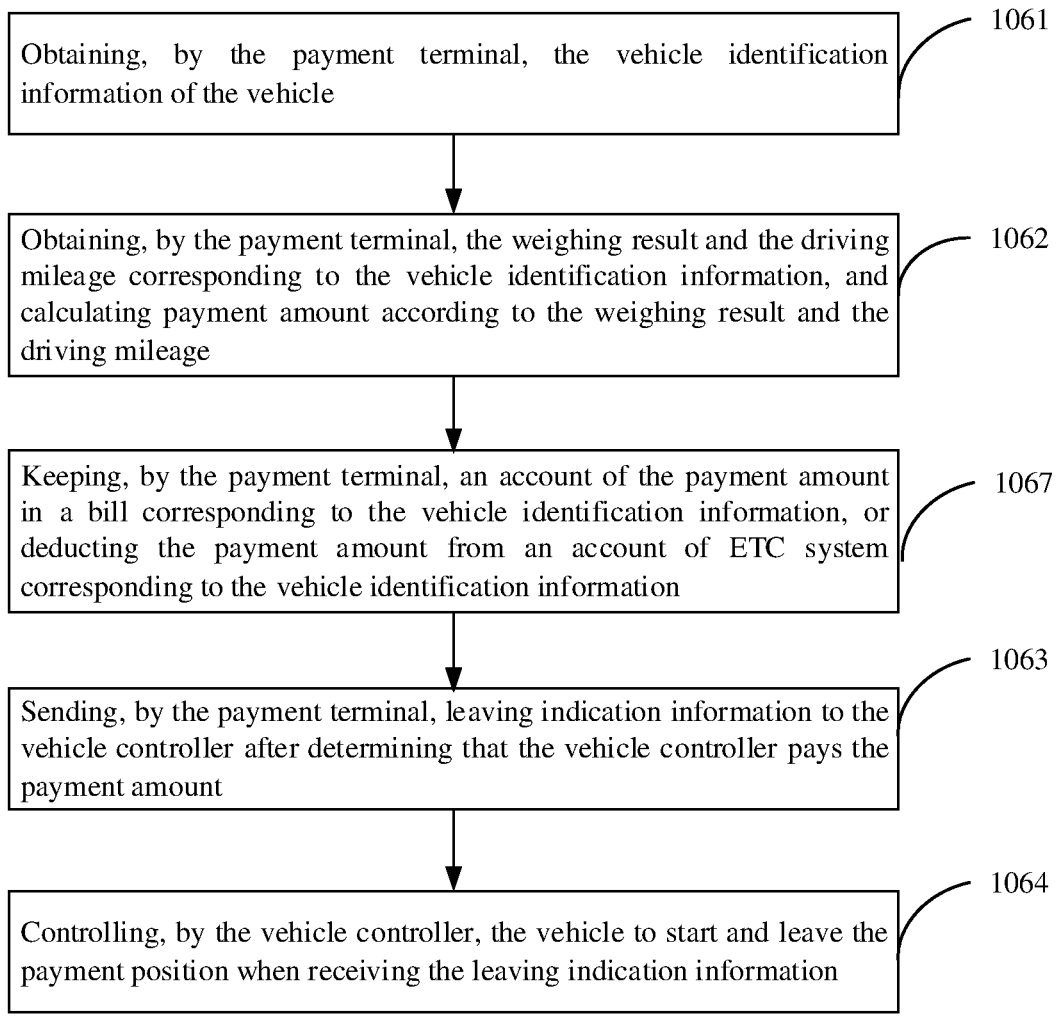
FIG. 6 is the third one of flow charts of the vehicle controller interacting with the payment terminal to accomplish the automatic payment in an embodiment of the application.

Based on the two ways described above, the above method flow as shown in FIG. 4 further include step 1067, as shown in FIG. 6:

Step 1067: keeping, by the payment terminal, an account of the payment amount in a bill corresponding to the vehicle identification information, or deducting the payment amount from an account of ETC system corresponding to the vehicle identification information.

In the above step 1063, the payment terminal determines that the vehicle controller pays the payment amount, which includes: the payment terminal determines that the vehicle controller pays the payment amount after keeping an account of the payment amount in the bill successfully or deducting the payment amount from the account of ETC system successfully.

Second Embodiment

Figure 7:
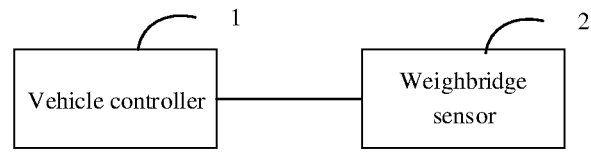
FIG. 7 is the first one of structural schematic diagrams of a system of implementing vehicle automatically weighing in an embodiment of the application.

Based upon the same concept as the method of implementing vehicle automatically weighing provided by the first embodiment described above, the second embodiment of the application provides a system of implementing vehicle automatically weighing. The structure of the system is as shown in FIG. 7, which includes a vehicle controller 1 and a weighbridge sensor 2, wherein:

the vehicle controller 1 is configured to control a vehicle to drive automatically and stop at a weighing position, and control the vehicle to start and leave the weighing position when receiving weighing end information sent by the weighbridge sensor 2;

the weighbridge sensor 2 is configured to weigh the vehicle when sensing the vehicle stopping at the weighing position, and send the weighing end information to the vehicle controller 1.

Figure 8:
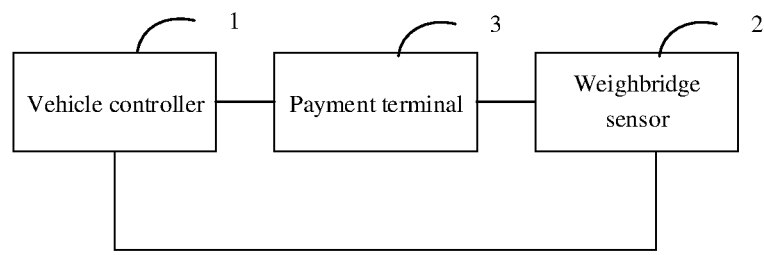
FIG. 8 is the second one of structural schematic diagrams of a system of implementing vehicle automatically weighing in an embodiment of the application.

Preferably, as shown in FIG. 8, the system further includes a payment terminal 3, and the weighing end information contains indication information indicating the vehicle to drive to a payment position;

the weighbridge sensor 2 is further configured to obtain the vehicle identification information of the vehicle, and send the weighing result and the vehicle identification information associatively to the payment terminal 3; and the vehicle controller 1 is further configured to control the vehicle to drive from the weighing position to the payment position, and interact with the payment terminal 3 corresponding to the payment position to accomplish the automatic payment.

Preferably, in the second embodiment of the application, the vehicle controller 1 interacts with the payment terminal 3 to accomplish the automatic payment, which includes: the payment terminal 3 obtains the vehicle identification information of the vehicle, obtains the weighing result and the driving mileage corresponding to the vehicle identification information, calculates the payment amount according to the weighing result and the driving mileage, and sends the leaving indication information to the vehicle controller 1 after determining that the vehicle controller 1 pays the payment amount; and the vehicle controller 1 is further configured to control the vehicle to start and leave the payment position when receiving the leaving indication information sent by the payment terminal corresponding to the payment position.

In the second embodiment of the application, the mode in which the payment terminal 3 obtains the vehicle identification information of the vehicle and the mode in which the payment terminal 3 determines that the vehicle controller 1 pays the payment amount can refer to the technical content related to the first embodiment, and a detailed description thereof will be omitted here.

Third Embodiment

Figure 9:
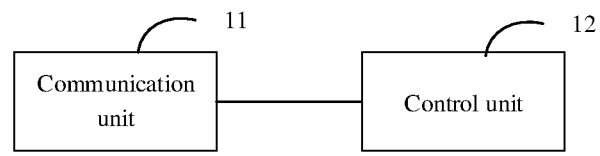
FIG. 9 is a structural schematic diagram of a vehicle controller in an embodiment of the application.

The third embodiment of the application provides a vehicle controller. The structure of the vehicle controller is as shown in FIG. 9, which includes:

a communication unit 11 configured to receive and send information;

a control unit 12 comprising a processor and at least one memory (not shown in the figure), where the at least one memory stores at least one machine executable instruction, and the processor executes the at least one machine executable instruction to control a vehicle to drive automatically and stop at a weighing position, and control the vehicle to start and leave the weighing position when receiving weighing end information.

The processor of the control unit 12 executes the at least one machine executable instruction to further send, through the communication unit 11, the vehicle identification information to the weighbridge sensor.

In some embodiments, the weighing end information contains indication information indicating the vehicle to drive to a payment position, and the processor of the control unit 12 executes the at least one machine executable instruction to further control the vehicle to drive from the weighing position to the payment position, and interact with a payment terminal corresponding to the payment position to accomplish an automatic payment.

The processor of the control unit 12 executes the at least one machine executable instruction to interact with the payment terminal corresponding to the payment position to accomplish the automatic payment, which includes: control the vehicle to start and leave the payment position when receiving, through the communication unit 11, leaving indication information sent from the payment terminal.

The processor of the control unit 12 executes the at least one machine executable instruction to further pay payment amount automatically when receiving, through the communication unit 11, the payment amount sent from the payment terminal.

The processor of the control unit 12 executes the at least one machine executable instruction to pay the payment amount automatically, which includes:

invoke a third-party payment software to pay the payment amount; or, control a vehicle-carried camera to scan a two-dimensional code corresponding to the payment terminal, and invoke a third-party payment software to pay the payment amount.

Fourth Embodiment

Figure 10:
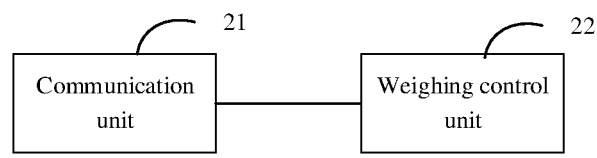
FIG. 10 is a structural schematic diagram of a weighbridge sensor in an embodiment of the application.

The fourth embodiment of the application provides a weighbridge sensor. The structure of the weighbridge sensor is as shown in FIG. 10, which includes:

a communication unit 21 configured to receive and send information;

a weighing control unit 22 comprising a processor and at least one memory (not shown in the figure), where the at least one memory stores at least one machine executable instruction, and the processor executes the at least one machine executable instruction to weigh a vehicle when sensing the vehicle stopping at a weighing position, and send, through the communication unit 21, weighing end information to a vehicle controller of the vehicle.

The processor of the weighing control unit 22 executes the at least one machine executable instruction to further obtain the vehicle identification information of the vehicle; and send the weighing result and the vehicle identification information associatively to a payment terminal.

Preferably, the weighing control unit further includes a sensor; and the processor of the weighing control unit 22 executes the at least one machine executable instruction to obtain the vehicle identification information of the vehicle, which includes:

the processor of the weighing control unit 22 executes the at least one machine executable instruction to receive, through the communication unit 21, the vehicle identification information from the vehicle controller of the vehicle; or, the processor of the weighing control unit 22 executes the at least one machine executable instruction to identify, by the sensor, the vehicle identification information of the vehicle.

The processor of the weighing control unit 22 executes the at least one machine executable instruction to identify, by the sensor, the vehicle identification information of the vehicle, which includes: control the sensor to take an image of the vehicle, and perform image identification processing on the image to obtain the vehicle identification information of the vehicle; or, control the sensor to scan a two-dimensional code or bar code on the vehicle, to obtain the vehicle identification information of the vehicle.

Fifth Embodiment

Figure 11:
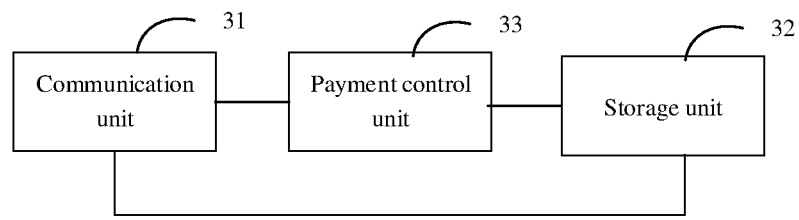
FIG. 11 is a structural schematic diagram of a payment terminal in an embodiment of the application.

The fifth embodiment of the application provides a payment terminal. The structure of the payment terminal is as shown in FIG. 11, which includes:

a communication unit 31 configured to receive and send information;

a storage unit 32 configured to store a weighing result and driving mileage corresponding to vehicle identification information;

a payment control unit 33 comprising a processor and at least one memory (not shown in the figure), where the at least one memory stores at least one machine executable instruction, and the processor executes the at least one machine executable instruction to obtain the vehicle identification information of a vehicle stopping at a weighing position and obtain the weighing result and the driving mileage corresponding to the vehicle identification information from the storage unit 32; calculate payment amount according to the obtained weighing result and driving mileage; and send, through the communication unit 31, leaving indication information to a vehicle controller after determining that the vehicle controller pays the payment amount.

In an example, the processor of the payment control unit 33 executes the at least one machine executable instruction to further send, through the communication unit 31, the payment amount to the vehicle controller; collect the payment amount paid by the vehicle controller; and determine that the vehicle controller pays the payment amount, which includes: determine, by the payment terminal, that the vehicle controller pays the payment amount when collecting the payment amount paid by the vehicle controller successfully.

In an example, the processor of the payment control unit 33 executes the at least one machine executable instruction to further keep an account of the payment amount in a bill corresponding to the vehicle identification information, or deduct the payment amount from an account of ETC system corresponding to the vehicle identification information; and the processor of the payment control unit 33 executes the at least one machine executable instruction to further determine that the vehicle controller pays the payment amount, which includes: determine that the vehicle controller pays the payment amount after keeping an account of the payment amount in the bill successfully or deducting the payment amount from the account of ETC system successfully.

Preferably, the processor of the payment control unit 33 executes the at least one machine executable instruction to further obtain the vehicle identification information of the vehicle stopping at the weighing position, which is configured to: identify the vehicle identification information of the vehicle; or, receive the vehicle identification information of the vehicle from the vehicle controller.

Preferably, the processor of the payment control unit 33 executes the at least one machine executable instruction to further identify the vehicle identification information of the vehicle, which includes:

control a sensor to take an image of the vehicle, and perform image identification processing on the image to obtain the vehicle identification information of the vehicle; or, control the sensor to scan a two-dimensional code or bar code on the vehicle, to obtain the vehicle identification information of the vehicle.

It should be understood by those skilled in the art that the embodiments of the present application can provide methods, systems and computer program products. Thus the present application can take the form of hardware embodiments alone, application software embodiments alone, or embodiments combining the application software and hardware aspects. Also the present application can take the form of computer program products implemented on one or more computer usable storage mediums (including but not limited to magnetic disk memories, CD-ROMs, optical memories and the like) containing computer usable program codes therein.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Although the preferred embodiments of the present application have been described, those skilled in the art can make additional alterations and modifications to these embodiments once they learn about the basic creative concepts. Thus the attached claims are intended to be interpreted to include the preferred embodiments as well as all the alterations and modifications falling within the scope of the present application.

Evidently those skilled in the art can make various modifications and variations to the application without departing from the spirit and scope of the application. Thus the application is also intended to encompass these modifications and variations therein as long as these modifications and variations come into the scope of the claims of the application and their equivalents.

What is claimed is:

1. A vehicle controller of a vehicle, comprising:
a control unit comprising a processor and at least one memory, wherein the at least one memory stores at least one machine executable instruction, which, upon execution by the processor, causes the processor to:
control the vehicle to leave a weighing position in response to receiving weighing end information;
control the vehicle to drive from the weighing position to a payment position based on a weighing end information; and
pay a payment amount in response to the receiving an indication sent from a payment terminal.

2. The vehicle controller according to claim 1, wherein the at least one machine executable instruction, when executed by the processor, causes the processor to control the vehicle to drive from the weighing position to a payment position based on the weighing end information.

3. The vehicle controller according to claim 1, wherein the at least one machine executable instruction, when executed by the processor, causes the processor to control the vehicle to leave the payment position in response to receiving leaving indication information sent from the payment terminal.

4. The vehicle controller according to claim 3, wherein the vehicle controller invokes a third-party payment software to pay the payment amount.

5. The vehicle controller according to claim 1, wherein the at least one machine executable instruction, when executed by the processor, causes the processor to send vehicle identification information to a weighbridge sensor.

6. The vehicle controller according to claim 1, wherein the at least one machine executable instruction, when executed by the processor, causes the processor to:
cause the vehicle to interact with the payment terminal to accomplish an automatic payment.

7. The vehicle controller according to claim 1, wherein the weighing end information is provided by a weighbridge sensor.

8. The vehicle controller according to claim 1, wherein the payment amount is determined using a weighing result, provided by a weighbridge sensor, and a driving mileage of the vehicle.

9. The vehicle controller according to claim 1, wherein the processor is configured to execute the at least one machine executable instruction to send vehicle identification information to the payment terminal.

10. A method of controlling a vehicle, comprising:
controlling a vehicle to drive automatically and stop at a weighing position using a control unit of a vehicle controller of the vehicle,
controlling the vehicle to leave the weighing position in response to receiving weighing end information of the vehicle controller of the vehicle, wherein the weighing end information contains indication information indicating the vehicle to drive to a payment position;
controlling the vehicle to drive from the weighing position to a payment position; and
controlling an on-board camera of the vehicle to scan a two-dimensional code corresponding to a payment terminal corresponding to the payment position,
wherein the vehicle controller invokes a third-party payment software to pay a payment amount.

11. The method of claim 10, comprising paying a payment amount automatically in response to the receiving the payment amount sent from the payment terminal.

12. The method of claim 10 comprising controlling the vehicle to leave the payment position in response to receiving leaving indication information sent from the payment terminal.

13. The method of claim 10, wherein the vehicle controller invokes a third-party payment software to pay the payment amount.

14. The method of claim 10, comprising sending vehicle identification information to a weighbridge sensor.

15. The method of claim 10, comprising causing the vehicle to interact with the payment terminal to accomplish an automatic payment.

16. The method of claim 10, wherein the weighing end information is provided by a weighbridge sensor.

17. The method of claim 10, comprising send vehicle identification information to the payment terminal.

18. The vehicle controller according to claim 13, wherein the payment amount is determined using a weighing result, provided by a weighbridge sensor, and a driving mileage of the vehicle.

19. A computer readable medium having code stored thereon, the code, when executed by a computer comprising one or more processors, causing the computer to implement a method, the code comprising instructions for:
controlling a vehicle to drive automatically and stop at a weighing position using a control unit of a vehicle controller of the vehicle,
controlling the vehicle to leave the weighing position in response to receiving weighing end information of the vehicle controller of the vehicle, wherein the weighing end information contains indication information indicating the vehicle to drive to a payment position;
controlling the vehicle to drive from the weighing position to a payment position; and controlling an on-board camera of the vehicle to scan a two-dimensional code corresponding to a payment terminal corresponding to the payment position,
wherein the vehicle controller invokes a third-party payment software to pay a payment amount.

20. The computer readable medium of claim 19, wherein the at least one machine executable instruction, when executed by the processor, causes the processor to control the vehicle to drive from the weighing position to a payment position based on the weighing end information.

* * * * *